(12) United States Patent
Nishioka et al.

(10) Patent No.: US 12,269,703 B2
(45) Date of Patent: Apr. 8, 2025

(54) CONVEYING BELT

(71) Applicant: Sumitomo Riko Company Limited, Aichi (JP)

(72) Inventors: Hironari Nishioka, Aichi (JP); Daisuke Inoue, Aichi (JP); Yasuyuki Hayasaki, Aichi (JP); Sho Sakamoto, Aichi (JP); Yasuhide Watanabe, Aichi (JP); Fumio Misumi, Aichi (JP); Daiki Ito, Aichi (JP); Isamu Maruyama, Aichi (JP); Shingo Nakaichi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 276 days.

(21) Appl. No.: 18/180,086

(22) Filed: Mar. 7, 2023

(65) Prior Publication Data

US 2023/0219777 A1    Jul. 13, 2023

Related U.S. Application Data

(63) Continuation of application No. PCT/JP2021/035388, filed on Sep. 27, 2021.

(30) Foreign Application Priority Data

Sep. 29, 2020   (JP) .................................. 2020-163997

(51) Int. Cl.
*B65H 5/02*      (2006.01)
*B29D 29/06*     (2006.01)
(Continued)

(52) U.S. Cl.
CPC ............... *B65H 5/02* (2013.01); *B29D 29/06* (2013.01); *B65G 15/32* (2013.01); *B65H 5/021* (2013.01);
(Continued)

(58) Field of Classification Search
CPC ........ B29D 29/06; B65G 15/32; B65G 15/34; B65H 5/021; B65H 2404/27; B65H 2801/06; G03G 15/6529; B41J 11/007
See application file for complete search history.

(56) References Cited

U.S. PATENT DOCUMENTS 4,745,023 A *  5/1988  Chapman ............... B65H 5/021
                                                    271/34
9,624,372 B2 *  4/2017  Yoshida ............. C08G 18/4277
(Continued)

FOREIGN PATENT DOCUMENTS

| JP | 2001310836 | 11/2001 |
| JP | 2008094605 | 4/2008 |
| JP | 2011073804 | 4/2011 |

OTHER PUBLICATIONS

European Search Opinion in corresponding European application. (Year: 2024).*

(Continued)

*Primary Examiner* — Mark A Deuble
(74) *Attorney, Agent, or Firm* — JCIPRNET

(57) ABSTRACT

A conveying belt has a cylindrical base layer, and a surface layer that is formed on the outer peripheral surface of the base layer. The base layer contains polyimide or polyamide-imide, and has an elastic modulus from 3-7 GPa, inclusive. The surface layer is configured as a cured object from a resin composition that contains a fluororesin having a hydroxy group, an isocyanate curing agent, and a silicone copolymer. The silicone copolymer is a copolymer containing a silicone unit and another kind of unit not having a siloxane skeleton, has a hydroxy group, and contains siloxane units in a proportion of at least 95 mol % and less than 100 mol %, or from 40-70 mol %, inclusive. The silicone copolymer con- (Continued)

tent in the resin composition is 1-5 parts by mass, inclusive, relative to a total 100 parts by mass of the fluororesin and the isocyanate curing agent.

10 Claims, 1 Drawing Sheet

(51) Int. Cl.
 *B65G 15/32* (2006.01)
 *G03G 15/00* (2006.01)
 *B41J 11/00* (2006.01)

(52) U.S. Cl.
 CPC ......... *G03G 15/6529* (2013.01); *B41J 11/007* (2013.01); *B65H 2404/27* (2013.01); *B65H 2801/06* (2013.01)

(56) References Cited

U.S. PATENT DOCUMENTS

| | | | | |
|---|---|---|---|---|
| 10,377,152 | B1* | 8/2019 | Wu | B41J 11/02 |
| 12,138,908 | B2* | 11/2024 | Schulkes | B65G 21/10 |
| 2007/0213157 | A1* | 9/2007 | Noda | B65H 5/025 |
| | | | | 474/237 |
| 2012/0165145 | A1* | 6/2012 | Kitano | B65G 15/36 |
| | | | | 474/264 |
| 2023/0242358 | A1* | 8/2023 | Shingu | G03G 15/162 |
| | | | | 271/198 |

OTHER PUBLICATIONS

"International Search Report (Form PCT/ISA/210) of PCT/JP2021/035388," mailed on Nov. 22, 2021, with English translation thereof, pp. 1-4.

* cited by examiner

CONVEYING BELT

CROSS-REFERENCE TO RELATED APPLICATION

This application is a continuation application of and claims priority benefit of a 371 application of an international PCT application serial no. PCT/JP2021/035388, filed on Sep. 27, 2021, which claims the priority benefit of Japan application JP2020-163997, filed on Sep. 29, 2020. The entirety of each of the above-mentioned patent applications is hereby incorporated by reference herein and made a part of this specification.

TECHNICAL FIELD

The present disclosure relates to a conveying belt included in an image forming device of an electrophotographic scheme or an ink jet scheme and used to convey a recording medium such as paper.

BACKGROUND ART

In image forming devices of the electrophotographic scheme or the ink jet scheme such as copy machines, printers, and facsimiles, conveying belts configured as endless belts are used to form images while placing and conveying recording media such as paper. In the image forming devices, the conveying belts used to convey the recording media often have two-layer configurations each including a base layer and a surface layer formed on the outer peripheral surface of the base layer. Patent Literature 1 (Japanese Patent Laid-Open No. 2001-310836), Patent Literature 2 (Japanese Patent Laid-Open No. 2008-94605), Patent Literature 3 (Japanese Patent Laid-Open No. 2011-73804) and the like disclose that component compositions and properties of the base layer and the surface layer in such a conveying belt are set from the viewpoint of achieving properties desired for the conveying belt, such as an adsorptive property, a cleaning property, and the like with respect to recording media.

Since a toner, ink, or paper powder adheres to a transfer belt in an image forming device of the electrophotographic scheme or the ink jet scheme, the surface of the conveying belt is wiped off with a cleaning blade to remove the adhering object. If the image forming device is continuously used for a long period of time, vibration may occur between the cleaning blade and the conveying belt and sliding noise may occur when the cleaning blade is caused to slide in a state where the cleaning blade is caused to abut the conveying belt. Particularly, in a case where a change in surface shape or surface slipperiness occurs in the conveying belt due to long-term utilization, sliding noise is likely to occur.

The present disclosure is to provide a conveying belt for an image forming device that is unlikely to cause sliding noise due to abutting and sliding of a cleaning blade even after long-term use.

SUMMARY

A conveying belt for an image forming device according to the present disclosure includes: a cylindrical base layer; and a surface layer that is formed on the outer peripheral surface of the base layer, the base layer containing at least one kind of polyimide or polyamide-imide, the base layer having an elastic modulus of equal to or greater than 3 GPa and equal to or less than 7 GPa, the surface layer being configured as a cured object from a resin composition that contains a fluororesin having a hydroxy group, an isocyanate curing agent, and a silicone copolymer, the silicone copolymer being a copolymer containing a silicone unit having a siloxane skeleton and another kind of unit not having a siloxane skeleton and having a hydroxy group, the silicone copolymer containing siloxane units in a proportion of equal to or greater than 95 mol % and less than 100 mol %, and the silicone copolymer content in the resin composition being equal to or greater than 1 part by mass and equal to or less than 5 parts by mass relative to a total of 100 parts by mass of the fluororesin and the isocyanate curing agent.

Another conveying belt according to the present disclosure includes: a cylindrical base layer; and a surface layer that is formed on the outer peripheral surface of the base layer, the base layer containing at least one kind of polyimide or polyamide-imide, the base layer having an elastic modulus of equal to or greater than 3 GPa and equal to or less than 7 GPa, the surface layer being configured as a cured object from a resin composition that contains a fluororesin having a hydroxy group, an isocyanate curing agent, and a silicone copolymer, the silicone copolymer being a copolymer containing a silicone unit having a siloxane skeleton and another kind of unit not having a siloxane skeleton and having a hydroxy group, the silicone copolymer containing siloxane units in a proportion of equal to or greater than 40 mol % and equal to or less than 70 mol %, and the silicone copolymer content in the resin composition being equal to or greater than 1 part by mass and equal to or less than 5 parts by mass relative to a total of 100 parts by mass of the fluororesin and the isocyanate curing agent.

DESCRIPTION OF EMBODIMENTS

Figure 1:
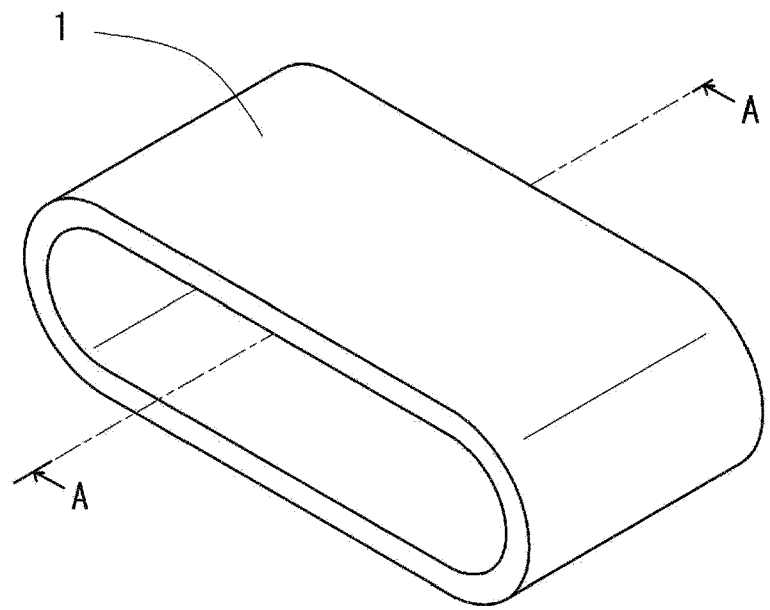
FIG. 1 is a perspective view illustrating an outline of a conveying belt according to an embodiment of the present disclosure.

A conveying belt for an image forming device according to the present disclosure includes: a cylindrical base layer; and a surface layer that is formed on the outer peripheral surface of the base layer, the base layer containing at least one kind of polyimide or polyamide-imide, the base layer having an elastic modulus of equal to or greater than 3 GPa and equal to or less than 7 GPa, the surface layer being configured as a cured object from a resin composition that contains a fluororesin having a hydroxy group, an isocyanate curing agent, and a silicone copolymer, the silicone copolymer being a copolymer containing a silicone unit having a siloxane skeleton and another kind of unit not having a siloxane skeleton and having a hydroxy group, the silicone copolymer containing siloxane units in a proportion of equal to or greater than 95 mol % and less than 100 mol %, and the silicone copolymer content in the resin composition being equal to or greater than 1 part by mass and equal to or less than 5 parts by mass relative to a total of 100 parts by mass of the fluororesin and the isocyanate curing agent.

Another conveying belt according to the present disclosure includes: a cylindrical base layer; and a surface layer that is formed on the outer peripheral surface of the base layer, the base layer containing at least one kind of polyimide or polyamide-imide, the base layer having an elastic modulus of equal to or greater than 3 GPa and equal to or less than 7 GPa, the surface layer being configured as a cured object from a resin composition that contains a fluororesin having a hydroxy group, an isocyanate curing agent, and a silicone copolymer, the silicone copolymer being a copolymer containing a silicone unit having a siloxane skeleton and another kind of unit not having a siloxane skeleton and having a hydroxy group, the silicone copolymer containing siloxane units in a proportion of equal to or greater than 40 mol % and equal to or less than 70 mol %, and the silicone copolymer content in the resin composition being equal to or greater than 1 part by mass and equal to or less than 5 parts by mass relative to a total of 100 parts by mass of the fluororesin and the isocyanate curing agent.

The surface layer may contain a fluorine-based or silicone-based leveling agent.

A microhardness on a surface of the surface layer may be equal to or greater than 30 $N/mm^2$ and equal to or less than 200 $N/mm^2$.

The thickness of the base layer may be equal to or greater than 50 μm and equal to or less than 90 μm.

The silicone copolymer may be configured of either acrylate-modified silicone oil and an OH-modified silicone oil as the silicone unit or methyl methacrylate and 2-hydroxyethyl methacrylate and trimethylolpropane as the other kind of unit.

In the aforementioned conveying belt according to the disclosure, since the base layer has the elastic modulus within the aforementioned predetermined range, vibration due to surface deformation accompanying degradation of rigidity and bending is not likely to occur between the conveying belt and the cleaning blade. Also, sufficient slipperiness on the surface of the conveying belt is secured by the surface layer being configured of the cured object of the composition containing the silicone copolymer along with the fluororesin and by the content proportion of the siloxane unit in the silicone copolymer and the amount of added silicone copolymer being within the aforementioned predetermined ranges. Also, the surface layer has high abrasion resistance, and it is possible to maintain a state of high slipperiness even if abutting and sliding of the cleaning blade continues for a long period of time. Both the base layer and the surface layer contribute to prevention of occurrence of sliding noise even if the conveying belt is used for a long period of time and the cleaning blade is caused to abut the conveying belt and slide thereon.

If the content proportion of the siloxane unit in the silicone copolymer is equal to or greater than 95 mol % and less than 100 mol %, the concentration of siloxane in the silicone copolymer is significantly high, the friction coefficient of the surface layer thus becomes significantly low, and a force received from the cleaning blade is weakened. In this manner, the abrasion resistance and durable slipperiness of the surface layer are improved, and sliding noise is unlikely to occur. Also, if the content proportion of the siloxane unit in the silicone copolymer is equal to or greater than 40 mol % and equal to or less than 70 mol %, excellent curability of the resin composition forming the surface layer is achieved, and as a result, abrasion resistance and durable slipperiness of the surface layer are improved, and sliding noise is unlikely to occur.

Here, if the surface layer contains the fluorine-based or silicone-based leveling agent, surface slipperiness of the surface layer is improved. As a result, it is possible to particularly effectively curb occurrence of sliding noise accompanying the abutting and the sliding of the cleaning blade.

Here, in a case where the microhardness on the surface of the surface layer is equal to or greater than 30 $N/mm^2$ and equal to or less than 200 $N/mm^2$, a conveying belt with excellent slipperiness and abrasion resistance is obtained. As a result, it is possible to particularly effectively curb occurrence of sliding noise accompanying the abutting and the sliding of the cleaning blade.

In a case where the thickness of the base layer is equal to or greater than 50 μm and equal to or less than 90 μm, it is possible to particularly effectively curb occurrence of vibration of the conveying belt due to deformation of the surface accompanying degradation of rigidity and bending. As a result, it is possible to particularly effectively curb occurrence of sliding noise accompanying the abutting and the sliding of the cleaning blade.

In the case where the silicone copolymer is configured of either acrylate-modified silicone oil and an OH-modified silicone oil as the silicone unit or methyl methacrylate and either 2-hydroxyethyl methacrylate and trimethylolpropane as the other kind of unit, it is possible to simply prepare a silicone copolymer with a hydroxy group introduced thereinto and with the content proportion of the siloxane unit adjusted to the predetermined range. Also, it is possible to cause the silicone copolymer to contribute to effective suppression of sliding noise in the conveying belt.

Hereinafter, a conveying belt according to an embodiment of the present disclosure will be described with reference to the drawings. Each property is assumed to be evaluated at a room temperature below. Also, a description that a certain component is a main component of a certain material means a state in which the component accounts for equal to or greater than 50% by mass of all the components of the material.

Figure 2:
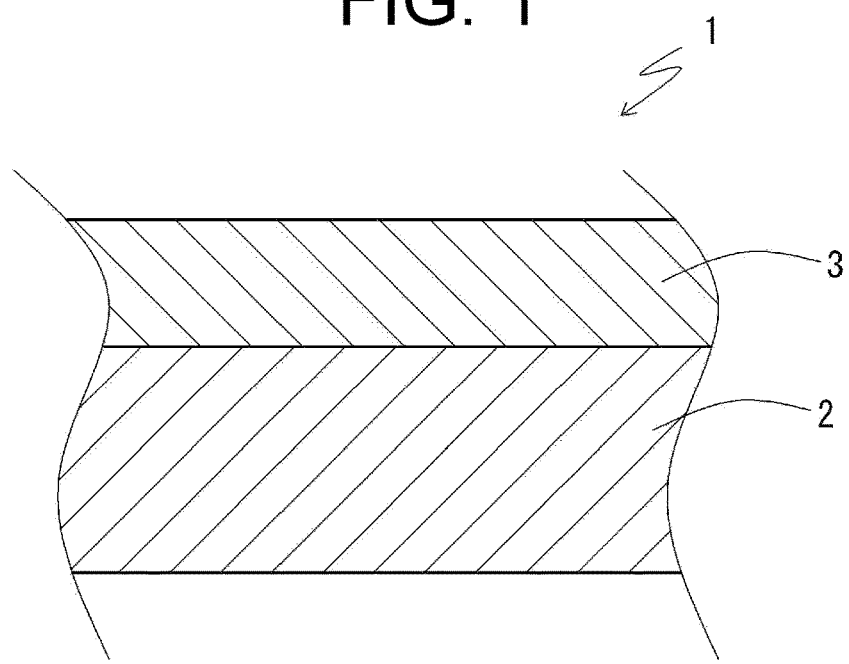
FIG. 2 is a sectional view along A-A of the conveying belt illustrated in FIG. 1.

FIGS. 1 and 2 illustrate an outline of a conveying belt according to an embodiment of the present disclosure. The conveying belt 1 is used in an image forming device of an electrophotography scheme or an ink jet scheme such as a copy machine, a printer, or a facsimile to place a recording medium such as paper thereon and convey the recording medium. The conveying belt 1 according to the embodiment can be suitably used in an image forming device of the ink jet scheme, in particular.

The conveying belt 1 is configured as an endless belt and includes a base layer 2 and a surface layer 3 that is formed on an outer peripheral surface of the base layer 2. The conveying belt 1 may be configured only of the base layer 2 and the surface layer 3, or another layer such as an adhesive layer may be appropriately provided between the base layer 2 and the surface layer 3.

In the image forming device, a cleaning blade (hereinafter, simply referred to as a blade in some cases) abut or slides on the conveying belt in order to wipe off an adhering object such as a toner, ink or paper pieces. In general, vibration is likely to occur between the conveying belt and the blade when the blade abuts and slides on the conveying belt for a long period of time if the image forming device is continuously used for a long period of time (hereinafter, referred to as at a time after endurance in some cases). When the blade is caused to abut and slide on the conveying belt, a sliding sound such as squeaking sound may occur with occurrence of vibration. However, according to the conveying belt 1 in the present embodiment, each of the base layer 2 and the surface layer 3 has a configuration as described below, and sliding sound accompanying the abutting and sliding of the blade is thus unlikely to occur even at a time after endurance.

[Configuration of Base Layer]

The base layer 2 is a base material of the conveying belt 1. The base layer 2 is formed into a cylindrical shape and has a seamless structure with no seam in the circumferential direction. The base layer 2 includes at least one kind of polyimide and polyamide-imide. Functional groups of polyimide and polyamide-imide may be modified. Polyimide and polyamide-imide can be suitably used as constituent materials of the base layer 2 in the conveying belt 1 due to their excellent rigidity and durability. Particularly, polyimide may be used to configure the base layer 2. The base layer 2 may contain other components such as an adhesive as long as the base layer 2 contains, as a main component, at least one kind of polyimide and polyamide-imide. Examples of the additive include a conductive agent such as carbon black or graphite, a filler such as calcium carbonate, a releasing agent, a flame retardant, a leveling agent, and an antifoaming agent.

The base layer 2 has an elastic modulus of equal to or greater than 3 GPa and equal to or less than 7 GPa. The elastic modulus of the base layer 2 can be evaluated as a tensile elastic modulus obtained by a tensile test. The conveying belt 1 has sufficiently high rigidity, and variations and vibration are not likely to occur in the conveying belt, by the base layer 2 having an elastic modulus of equal to or greater than 3 GPa. As a result, high slipperiness is likely to obtained on the surface of the conveying belt 1, which contributes to suppression of sliding sound at a time after endurance. From the viewpoint of enhancing such effects, the elastic modulus of the base layer 2 may be equal to or greater than 4 GPa.

On the other hand, deformation of the surface of the base layer 2 is unlikely to occur by the elastic modulus of the base layer 2 being caused to fall in the range of equal to or less than 7 GPa. If the elastic modulus of the base layer 2 is excessively high, bending deformation applied to location where the conveying belt 1 is in contact with shaft members is unlikely to be canceled even if the conveying belt 1 is separated from the shaft members, and the deformation is likely to be accumulated in the surface of the conveying belt 1 through rotating motion for a long period of time, when the conveying belt 1 is supported by the shaft members at two locations and is caused to rotate in a state where a tensile force is applied thereto. Such deformation of the conveying belt 1 leads to formation of damage such as cracking and occurrence of vibration. Bending resistance of the conveying belt 1 increases by the elastic modulus of the base layer 2 being caused fall in the range of equal to or less than 7 GPa, and as a result, it is possible to curb occurrence of surface deformation and vibration of the conveying belt 1 accompanying the surface deformation. From the viewpoint of enhancing such effects, the elastic modulus of the base layer 2 may be equal to or less than 6 GPa.

In this manner, high slipperiness and bending resistance of the conveying belt 1 are secured by the base layer 2 having an elastic modulus of equal to or greater than 3 GPa and equal to or less than 7 GPa. As a result, vibration is unlikely to occur between the conveying belt 1 and the blade even at a time after endurance, and occurrence of sliding sound accompanying the sliding of the blade is curbed.

Although the thickness of the base layer 2 is not particularly limited, the thickness of the base layer 2 may be equal to or greater than 50 μm and in some embodiments equal to or greater than 60 μm. Also, the thickness of the base layer 2 may be equal to or less than 90 μm and in some embodiments equal to or less than 80 μm. In a case where the base layer 2 has a thickness within such a range, slipperiness and bending resistance of the conveying belt are enhanced, and a particularly excellent effect of curbing sliding sound at a time after endurance is thus achieved.

[Configuration of Surface Layer]

Figure 3:
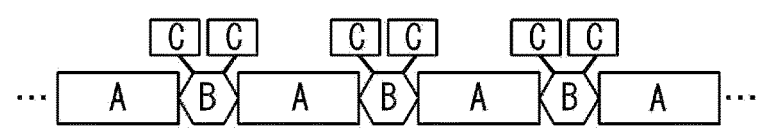
FIG. 3 is a schematic view for illustrating a molecular structure of a cured object constituting a surface layer.

The surface layer 3 is configured as a cured object of a resin composition. The resin composition configuring the surface layer 3 contains a fluororesin, an isocyanate curing agent, and a silicone copolymer. Each of the fluororesin and the silicone copolymer has a hydroxy group. In the cured object, the hydroxy groups in the fluororesin and the silicone copolymer form a urethane bond with the isocyanate group in the isocyanate curing agent. Specifically, multiple bonds are formed by the fluororesin A being crosslinked by the isocyanate curing agent B to form a main skeleton, and the silicone copolymer C is bonded to the main skeleton and is distributed in a region including the surface of the surface layer 3 as will be described in FIG. 3.

The fluororesin is a main component of the resin composition configuring the surface layer 3 and plays a role as a binder polymer in the resin composition. The fluororesin includes a hydroxy group introduced thereinto through modification or the like. Although specific kind of the fluororesin is not particularly limited as long as the fluororesin can be cured after being appropriately dissolved in a solvent and being caused to form a film in a liquid form, examples thereof can include an ethylene fluoride-vinyl ether copolymer (FEVE), polyvinylidene fluoride resin (PVDF), and a polychlorotrifluoroethylene resin (PCTFE), and a fluororesin that is commercially available as a binder polymer can be suitably used. The surface layer exhibits high adhesiveness to the base layer 2 by configuring the surface layer 3 as a cured object of the resin composition containing the fluororesin.

The isocyanate curing agent to be added to the resin composition is not particularly limited as long as the isocyanate curing agent is a polyfunctional isocyanate compound. A curing agent made of blocked polyisocyanate can be suitably used.

The silicone copolymer contained in the resin composition is configured as a copolymer containing a silicone unit having a siloxane skeleton and another kind of unit not having a siloxane skeleton. The silicone unit and another kind of unit may be block-copolymerized in the silicon copolymer. The silicone copolymer has a hydroxy group.

Although the kind of silicone unit configuring the silicone copolymer is not particularly limited, silicone oil configured of a dimethyl silicone resin, a methyl phenyl silicone resin, alkyl-modified silicone resin, an alkyl-modified silicone resin, or OH-modified silicone oil can be suitably used. Only one kind of silicone unit may be used, or two or more kinds thereof may be used together.

Although the other unit configuring the silicone copolymer along with the silicone unit is not particularly limited as long as it can be copolymerized with the silicone unit, it is possible to suitably use the other kind of unit containing, as a part or an entirety of the structure, a (meth)acrylic acid, (meta)acrylic acid ester, or trimethylolpropane. A molecule having a hydroxy group may be used as the other kind of unit since it is possible to simply introduce the hydroxy group into the silicone copolymer. For example, (meth)acrylic acid ester having a hydroxy group, for example, can be suitably used as the other kind of unit. The other kind of unit may be configured only of one kind of molecule, or two or more kinds of molecules may be used together. In the case where two or more kinds of molecules are used together, a block in which the two or more kinds of molecules are present together and are polymerized may configure the copolymer with the silicone unit, or each of the kinds of molecules may configure a block and then configure a copolymer with the silicone unit. Also, in the case where two or more kinds of molecules are used together as the other kind of unit, hydroxy groups may be introduced into all the kinds of molecules, or hydroxy groups may be introduced into some of the kinds of molecules.

Suitable examples of the silicon copolymer include a silicon copolymer configured of acrylate-modified silicone oil as a silicone unit and methacrylic acid methyl and 2-hydroxyethyl methacrylate as the other unit. As will be described in examples, the surface layer 3 formed by using the silicone copolymer has an especially high slipperiness improving effect, and as a result, exhibits a high effect of curbing sliding sound at a time after endurance.

In the silicone copolymer, the concentration of siloxane is equal to or greater than 95 mol % and less than 100 mol % or equal to or greater than 40 mol % and equal to or less than 70%. The concentration of siloxane is the proportion of the siloxane unit (Si—O unit) accounting for relative to all monomer units in the entire silicone copolymer, which is represented in unit of mol %. In other words, the concentration of siloxane represents the proportion of the number of siloxane units accounting for relative to a total of the number of siloxane units configuring the silicone unit and the number of monomer units configuring the other kind of unit.

In the surface layer 3 of the conveying belt 1, the silicone copolymer functions as a modifier for improving slipperiness. The effect of improving slipperiness can be sufficiently exhibited by the concentration of siloxane in the silicone copolymer being equal to or greater than 40 mol %. Also, abrasion resistance of the surface layer 3 is also enhanced. It is possible to cause the blade to smoothly slide along the surface of the conveying belt 1 by the slipperiness of the surface layer 3 being improved, and occurrence of sliding sound is thus curbed. From the viewpoint of further enhancing the effect of improving slipperiness and abrasion resistance, the concentration of siloxane may be equal to or greater than 45 mol %, further equal to or greater than 50 mol %, equal to or greater than 55 mol %, or equal to or greater than 60 mol %.

On the other hand, if the concentration of siloxane is excessively high, the abrasion resistance of the surface layer 3 rather decreases. This is because curing failure of the resin composition occurs, the hardness of the surface layer 3 thus becomes excessively low, and the surface layer 3 is likely to be worn by the blade when the blade is caused to abut the conveying belt 1 and slide thereon. The effect of improving slipperiness achieved by the surface layer 3 is degraded due to abrasion of the surface layer 3, which may be a reason of occurrence of sliding sound. It is possible to sufficiently cure the surface layer 3 and to enhance abrasion resistance by causing the concentration of siloxane to fall in the range of equal to or less than 70 mol %, and as a result, the state where slipperiness is high is maintained even at a time after endurance, and it is possible to curb occurrence of sliding sound. Adhesiveness of the surface layer 3 to the base layer 2 is also enhanced. From these viewpoints, it is only necessary for the content proportion of the siloxane unit in the silicone copolymer to be equal to or greater than 40 mol % and equal to or less than 70 mol %. This is because as a result of excellent curability of the resin composition forming the surface layer 3, abrasion resistance and durable slipperiness of the surface layer 3 are improved, and sliding sound is unlikely to occur.

On the other hand, if the concentration of siloxane is further high concentration, a friction coefficient of the surface layer 3 becomes significantly low unlike the above knowledge, and the force received from the cleaning blade is weakened. In this manner, abrasion resistance and the durable slipperiness of the surface layer 3 are improved, and sliding sound is curbed. This is presumed to be because the effect achieved by a decrease in friction coefficient exceeds the influence of curability of the resin composition. From this viewpoint, the concentration of siloxane in the silicone copolymer may be equal to or greater than 95 mol %. The concentration of siloxane may be, in some embodiments, equal to or greater than 96 mol %. On the other hand, if the concentration of siloxane is 100 mol %, there is no reaction point with the fluororesin, the silicone copolymer is thus not fixed, abrasion resistance and durable slipperiness are degraded, and sliding sound is likely to occur. Therefore, from these viewpoints, the concentration of siloxane in the silicone copolymer may be equal to or greater than 95 mol % and less than 100 mol %. Also, the concentration of siloxane in the siloxane copolymer may be, in some embodiments, equal to or less than 99 mol % and in some embodiments equal to or less than 98 mol %.

In the silicone copolymer, adjustment of the concentration of siloxane can be performed by selecting a ratio between the silicone unit and another kind of unit configuring the silicone copolymer, for example. Furthermore, it is possible to adjust the concentration of the hydroxy group in addition to the concentration of siloxane in the silicone copolymer by adopting the form in which other kinds of units that have a hydroxy group and do not have a hydroxy group, such as methyl methacrylate and 2-hydroxyethyl methacrylate described above as an example, are used together.

In the resin composition configuring the surface layer 3, the amount of added silicone copolymer is equal to or greater than 1 phr and equal to or less than 5 phr, that is, equal to or greater than 1 part by mass and equal to or less than 5 parts by mass relative to a total of 100 parts by mass of the fluororesin and the isocyanate cured object. It is possible to cause the effect of improving slipperiness and abrasion resistance achieved by the silicone copolymer and thus curbing sliding noise at a time after endurance to be sufficiently exhibited in the surface layer 3 in addition to the effect achieved by the concentration of siloxane in the silicone copolymer being equal to or greater than 40 mol % by the amount of added silicone copolymer being equal to or greater than 1 phr. The amount of added silicone copolymer may be, in some embodiments, equal to or greater than 2 phr.

On the other hand, it is possible to avoid a curing failure of the surface layer 3, to enhance abrasion resistance, and to effectively curb sliding sound at a time after endurance in addition to the effect achieved by the concentration of siloxane in the silicone copolymer being caused to fall in the range of equal to or less than 70 mol % by the amount of added silicone copolymer being caused to fall in the range of equal to or less than 5 phr. The adhesion of the surface layer 3 to the base layer 2 is also enhanced. The amount of added silicone copolymer may be, in some embodiments, equal to or less than 4 phr.

The resin composition configuring the surface layer 3 may appropriately contain other components such as an additive in addition to the fluororesin, the isocyanate curing agent, and the silicone copolymer described above. Examples of the additive include various additives that are similar to those that can be added to the base layer 2, such as a conductive agent, a filler, a releasing agent, a flame retardant, a leveling agent, and an antifoaming agent, an organic solvent, and the like.

As the leveling agent, a fluorine-based or silicone-based leveling agent may be used. If the surface layer 3 contains a fluorine-based or silicone-based leveling agent, surface smoothness of the surface layer 3 is improved. As a result, it is possible to particularly effectively curb occurrence of sliding sound accompanying the abutting and the sliding of the cleaning blade. Although the surface smoothness of the surface layer 3 is likely to be degraded due to influences of curability of the composition in a case where the concentration of siloxane in the silicone copolymer is a further high concentration (in a case where the concentration of siloxane is equal to or greater than 95 mol %, for example), the degradation of surface smoothness of the surface layer 3 is curbed if the surface layer 3 contains the fluorine-based or silicone-based leveling agent.

In the resin composition configuring the surface layer 3, the amount of added leveling agent may be equal to or greater than 0 phr and equal to or less than 5 phr, that is, equal to or greater than 0 parts by mass and equal to or less than 5 parts by mass relative to a total amount 100 parts by mass of the fluorine resin and the isocyanate cured object.

The microhardness of the surface of the surface layer 3 configured as the cured object of the resin composition described above may be equal to or greater than 30 N/mm$^2$ and equal to or less than 200 N/mm$^2$. The microhardness of the surface can be measured by using a microhardness meter. It is only necessary to set a load to be applied to a probe at the time of the measurement to 5.0 mN, for example. In a case where the microhardness of the surface of the surface layer 3 is equal to or greater than 30 N/mm$^2$, abrasion resistance of the surface layer 3 increases, and a high effect of curbing sliding source at a time after endurance is exhibited. Moreover, the microhardness may be, in some embodiments, equal to or greater than 50 N/mm$^2$ or equal to or greater than 70 N/mm$^2$. On the other hand, in a case where the microhardness of the surface layer 3 is equal to or less than 200 N/mm$^2$, it is easy to secure bending resistance of the conveying belt 1, and further, it is possible to effectively curb occurrence of sliding sound caused by surface deformation accompanying bending. The microhardness may be, in some embodiments, equal to or less than 170 N/mm$^2$ or equal to or less than 150 N/mm$^2$.

The thickness of the surface layer 3 is not particularly limited. However, the surface layer 3 may be caused to have a thinner thickness than that of the base layer 2. Also, properties that the cured object of the resin composition containing the silicone copolymer exhibits, such as an improvement in slipperiness and abrasion durability, can be easily exhibited by setting the thickness of the surface layer 3 to be equal to or greater than 25 μm. On the other hand, bending resistance of the conveying belt 1 can be easily maintained in a high level by causing the thickness of the surface layer 3 to fall in the range of equal to or less than 60 μm.

The conveying belt 1 according to the present embodiment can be manufactured as follows. First, the base layer 2 is formed. For the base layer 2, a base layer forming material in the form of a coating is applied to an outer peripheral surface of a cylindrical or columnar mold by appropriately using a solvent or the like and is then dried. A heat treatment may be performed thereon as needed. Examples of the application method include a dip coating method, a dispenser coating method (nozzle coating method), a roll coating method, and a ring coating method. Then, the resin composition for the surface layer is applied to and cured on the surface of the formed base layer 2, and the surface layer 3 is thereby formed. At this time, it is possible to promote the curing of the resin composition by performing a heat treatment as needed. For the application of the resin composition, it is possible to use various methods that are similar to those listed in regard to the formation of the base layer 2 above. Finally, the mold is removed, and the conveying belt 1 with the surface layer 3 formed on the outer peripheral surface of the base layer 2 is thereby obtained. In this manner, the manufacturing process of the conveying belt 1 is simplified, and it is possible to reduce the cost required to manufacture the conveying belt 1 by the surface layer 3 being able to be formed through the application of the liquid form composition.

EXAMPLES

Hereinafter, the present disclosure will be described in detail by using examples and comparative examples. The present disclosure is not limited by the following examples.
[Production of Samples]
(1) Synthesis of Silicone Copolymers First, silicone copolymers to be used as silicone modifiers at the time of forming the surface layer were synthesized.

For the synthesis of the silicone copolymers, each of the following raw materials was used.

Methyl methacrylate (manufactured by Tokyo Chemical Industry Co., Ltd.) (molecular weight: 100.12)

Butyl methacrylate (manufactured by Tokyo Chemical Industry Co., Ltd.) (molecular weight: 128.17)

2-hydroxyethyl methacrylate (manufactured by Tokyo Chemical Industry Co., Ltd.) (molecular weight: 130.14)

Acrylate-modified silicone oil (manufactured by Shin-Etsu Chemical Co., Ltd., "X-22-174DX") (molecular weight: 4600, the number of siloxane units per molecular chain: 60.45)

Radical polymerization initiator: 1,1'-azobis (cyclohexane-1-carbonitrile) (manufactured by Fujifilm Wako Pure Chemical Corporation) (molecular weight: 244.34)

Silicone copolymers were synthesized by the following method using each of the raw materials illustrated in Table 1 below as silicone A to J. First, the three kinds of raw materials illustrated in Table 1 and methyl isobutyl ketone (MIBK) were put into a 0.5 L reaction flask such that the solid content was 50% first. Nitrogen bubbling was performed for five minutes while the content in the flask was stirred, then a polymerization reaction was caused to advance with the temperature of the solution therein maintained at 100° C. for 10 hours. Thereafter, MIBK was added such that the solid content was 30%, and copolymer solutions were thereby obtained as silicone A to J.

Table 1 illustrates the amount of each raw material used in the synthesis of the silicone A to J (unit: g). In addition, the concentrations of siloxane calculated from the amounts of each raw material used are also illustrated (unit: mol %). Additionally, Table 1 also lists commercially available hydroxy-modified silicone and non-modified silicone and their concentrations of siloxane. The commercially available hydroxy-modified silicone and the non-modified silicone were as follows.

Silicone K (hydroxy-modified silicone): manufactured by JNC "Silaplane FMDA21", concentration of siloxane: 96 mol %, solid content: 100%

Silicone L (hydroxy-modified silicone): manufactured by JNC "Silaplane FMDA26", concentration of siloxane: 99 mol %, solid content: 100%

Silicone M (non-modified silicone oil): manufactured by Shin-Etsu Chemical Co., Ltd., "KF-54", concentration of siloxane: 100 mol %, solid content: 100%

Isocyanate curing agent 1: manufactured by AGC Coat-Tech Co., Ltd., "Obbligato SS0054 curing agent" (solid content: 83%)

Isocyanate curing agent 2: manufactured by AGC Coat-Tech Co., Ltd., "Obbligato SS0062 curing agent" (solid content: 42%)

TABLE 1

| | Amount of used raw material (g) | | | | | Concentration of siloxane (mol %) |
|---|---|---|---|---|---|---|
| | Methyl methacrylate | Butyl methacrylate | 2-hydroxyethyl methacrylate | Acrylate-modified silicone oil | Radical polymerization initiator | |
| Silicone A | 22.03 | — | 16.92 | 49.46 | 3.53 | 65 |
| Silicone B | 37.04 | — | 16.92 | 38.05 | 4.97 | 50 |
| Silicone C | 47.06 | — | 16.92 | 30.44 | 5.93 | 40 |
| Silicone D | 32.04 | — | 16.92 | 41.85 | 4.49 | 55 |
| Silicone E | 17.02 | — | 16.92 | 53.27 | 3.05 | 70 |
| Silicone F | — | 28.20 | 16.92 | 49.46 | 3.53 | 65 |
| Silicone G | 52.06 | — | 16.92 | 26.63 | 6.41 | 35 |
| Silicone H | 12.01 | — | 16.92 | 57.07 | 2.56 | 75 |
| Silicone I | 35.04 | — | — | 49.46 | 3.53 | 65 |
| Silicone J | — | 44.86 | — | 49.46 | 3.53 | 65 |
| Silicone K | Hydroxy-modified silicone | | | | | 96 |
| Silicone L | Hydroxy-modified silicone | | | | | 99 |
| Silicone M | Non-modified silicone oil | | | | | 100 |

(2) Preparation of Resin Composition for Surface Layer

Next, the resin compositions for surface layers were prepared by using the silicone modifiers including the silicone copolymers synthesized as described above.

For preparing the compositions, the following raw materials were used as raw materials other than the silicone copolymers. Here, the purpose of using two kinds of fluororesins was to provide different levels of hardness at the time of curing by the two kinds of fluororesins and to change microhardness of the surfaces of the resin compositions by the mixing ratios of the two kinds. Both the two kinds of fluorine resins have hydroxy groups.

Fluororesin 1: manufactured by AGC Coat-Tech Co., Ltd., "Obbligato SS0054 principal agent" (solid content: 46%)

Fluororesin 2: manufactured by AGC Coat-Tech Co., Ltd., "Obbligato SS0062 principal agent" (Solid content: 38%)

Each component illustrated in Table 2 below was mixed, and Compositions A-1 to A-7, compositions B to J, Compositions K-1 to K-4, and Compositions L to M were prepared. At this time, each component illustrated in Table 2 was put into a glass bottle and was stirred by a blade stirrer for five minutes. Note that commercially available silicone copolymers were used as they are rather than the silicone copolymers synthesized as described above as silicone modifiers for Compositions K-1 to K-4 and Compositions L to M. Table 2 also illustrates the amounts of added silicone modifiers in the compositions (unit: the added mass relative to a total of 100 parts by mass of phr-fluororesin and the isocyanate cured object was calculated in terms of the solid content) in addition to mass (unit: g) of each component.

TABLE 2

| | Contained component (g) | | | | | | Amount of added silicone modifier (phr) |
|---|---|---|---|---|---|---|---|
| | Fluororesin 1 | Fluororesin 2 | Isocyanate curing agent 1 | Isocyanate curing agent 2 | Silicone modifier | | |
| | | | | | Kind | Amount (g) | |
| Composition A-1 | 47.58 | 44.89 | 4.95 | 9.88 | Silicone A | 4.72 | 3 |
| Composition A-2 | 47.58 | 44.89 | 4.95 | 9.88 | Silicone A | 1.57 | 1 |
| Composition A-3 | 47.58 | 44.89 | 4.95 | 9.88 | Silicone A | 7.87 | 5 |
| Composition A-4 | 10.29 | 88.02 | 1.07 | 19.36 | Silicone A | 4.72 | 3 |
| Composition A-5 | 86.40 | — | 8.99 | — | Silicone A | 4.72 | 3 |
| Composition A-6 | 47.58 | 44.89 | 4.95 | 9.88 | Silicone A | 0.79 | 0.5 |
| Composition A-7 | 47.58 | 44.89 | 4.95 | 9.88 | Silicone A | 11.01 | 7 |
| Composition B | 47.58 | 44.89 | 4.95 | 9.88 | Silicone B | 4.72 | 3 |

TABLE 2-continued

| | Contained component (g) | | | | | | Amount of added silicone modifier (phr) |
|---|---|---|---|---|---|---|---|
| | Fluoro-resin 1 | Fluoro-resin 2 | Isocyanate curing agent 1 | Isocyanate curing agent 2 | Silicone modifier Kind | Amount (g) | |
| Composition C | 47.58 | 44.89 | 4.95 | 9.88 | Silicone C | 4.72 | 3 |
| Composition D | 47.58 | 44.89 | 4.95 | 9.88 | Silicone D | 4.72 | 3 |
| Composition E | 47.58 | 44.89 | 4.95 | 9.88 | Silicone E | 4.72 | 3 |
| Composition F | 47.58 | 44.89 | 4.95 | 9.88 | Silicone F | 4.72 | 3 |
| Composition G | 47.58 | 44.89 | 4.95 | 9.88 | Silicone G | 4.72 | 3 |
| Composition H | 47.58 | 44.89 | 4.95 | 9.88 | Silicone H | 4.72 | 3 |
| Composition I | 47.58 | 44.89 | 4.95 | 9.88 | Silicone I | 4.72 | 3 |
| Composition J | 47.58 | 44.89 | 4.95 | 9.88 | Silicone J | 4.72 | 3 |
| Composition K-1 | 47.58 | 44.89 | 4.95 | 9.88 | Silicone K | 0.47 | 1 |
| Composition K-2 | 47.58 | 44.89 | 4.95 | 9.88 | Silicone K | 2.36 | 5 |
| Composition K-3 | 47.58 | 44.89 | 4.95 | 9.88 | Silicone K | 0.24 | 0.5 |
| Composition K-4 | 47.58 | 44.89 | 4.95 | 9.88 | Silicone K | 3.30 | 7 |
| Composition L | 47.58 | 44.89 | 4.95 | 9.88 | Silicone L | 0.47 | 1 |
| Composition M | 47.58 | 44.89 | 4.95 | 9.88 | Silicone M | 0.47 | 1 |

(3) Production of Conveying Belts

As base layer materials, the following five kinds of polyimide were prepared.

PI-1: manufactured by Hitachi Chemical Industry Co., Ltd. HCI-1300 (elastic modulus: 5 GPa)

PI-2: manufactured by Hitachi Chemical Industry Co., Ltd. HCI-1300 and HCI-1100 were mixed (mixing ratio (1:2) (elastic modulus: 3 GPa)

PI-3: manufactured by Hitachi Chemical Industry Co., Ltd. HCI-1300 and HCI-1200 were mixed (mixing ratio 1:1) (elastic modulus: 7 GPa)

PI-4: manufactured by Hitachi Chemical Industry Co., Ltd. HCI-1100 (elastic modulus: 2 GPa)

PI-5: manufactured by Hitachi Chemical Industry Co., Ltd. HCI-1200M (elastic modulus: 9 GPa)

Each of the above base layer materials was applied to the surfaces of cylindrical molds by the dip coating method, was heated at 120° C. for 30 minutes, at 150° C. for 10 minutes, at 200° C. for 10 minutes, at 250° C. for 10 minutes, and at 350° C. for 10 minutes, and base layers were thereby formed. At this time, the thicknesses of the base layers were controlled by the solid content of the coatings and the lifting speeds of the molds as illustrated in Tables 3 and 4.

Next, surface layers were formed on the surfaces of the base layers. Formation of the surface layers was performed by applying the resin compositions formed as described above to the surfaces of the base layers by the dipping method, further heating them at 160° C. for 30 minutes, and causing a curing reaction. The thickness of the surface layers of all the samples was set to 45 μm. Finally, the molds were removed, and conveying belts in Examples 1 to 19 and Comparative Examples 1 to 11 were produced. Note that fluorine-based or silicone-based leveling agents were added to the resin compositions in Examples 18 and 19 (5 phr).

Fluorine-based leveling agent: manufactured by AGC Seimi Chemical Co., Ltd., "Surflon S-658"

Silicone-based leveling agent: manufactured by Shin-Etsu Chemical Co., Ltd., "x-22-4515"

[Evaluation Method]

The following evaluation was conducted on each of the conveying belts produced as described above.

(1) Microhardness of Surface Layers

Microhardness of the surface layers formed using the resin compositions was measured in the form of the conveying belts in which the surface layers were formed on the base layers. The measurement was performed using a microhardness meter. A load applied to a probe at the time of the measurement was 5.0 mN.

(2) Sliding Sound

The conveying belts were set in WF-C20590 paper conveying units manufactured by Seiko Epson Corporation, and they were caused to rotate at a peripheral speed of 420 mm/second. Conveying belts from which sliding sound did not occur for not less than 300 hours were evaluated as "A+". Conveying belts from which sliding sound occurred within a range of equal to or greater than 270 hours and less than 300 hours were evaluated as "A", conveying belts from which sliding sound occurred within a range of equal to or greater than 240 hours and less than 270 hours were evaluated as "B", and conveying belts from which sliding sound occurred within a range of less than 240 hours were evaluated as "C". In a case where the evaluation results were A+, A, or B, it was possible to determine that occurrence of sliding sound at a time after endurance was sufficiently curbed. On the other hand, in a case where the evaluation results were C, curbing of sliding sound at a time of endurance was determined not to be sufficient.

(3) Abrasion Resistance

The conveying belts were set in the above paper conveying units, and a duration test of causing them to rotate at a peripheral speed of 420 mm/second for 240 hours was conducted. Film thicknesses before and after the duration test were measured by an eddy current meter, and differences in film thicknesses (amounts of decrease) were regarded as amounts of abrasion. Conveying belts with the amounts of abrasion of equal to or less than 3 μm were evaluated as "A", conveying belts with the amounts of abrasion of greater than 3 μm and equal to or less than 5 μm were evaluated as "B", and conveying belts with the amounts of abrasion of greater than 5 μm were evaluated as "C". In a case where the evaluation results were A or B, it was possible to determine that abrasion resistance was sufficient. On the other hand, in a case where the evaluation results were C, abrasion resistance was determined not to be sufficient.

(4) Surface Smoothness

The conveying belts were set on columnar molds with a diameter of 8.2 cm, and surface smoothness evaluation was conducted. Ten-point average roughness (Rz) was measured in accordance with JIS B 0603:1994 using a roughness meter (manufactured by ACCRETECH, "SURFCOM1400D"). Conveying belts with Rz of less than 0.8 μm were evaluated as "A", conveying belts with Rz of equal to or greater than 0.8 μm and less than 1 μm were evaluated as "B", and conveying belts with Rz of equal to or greater than 1.0 μm were evaluated as "C". In a case where the evaluation results were A or B, it was possible to determine that the surface smoothness was sufficient. On the other hand, in a case where the evaluation results were C, surface smoothness was determined not to be sufficient.

(5) Bending Resistance

The conveying belts were set in the above paper conveying units, and a duration test of causing them to rotate at a peripheral speed of 420 mm/second for 240 hours was conducted. The surfaces of the surface layers were visually observed after the duration test, and conveying belts with no cracking observed in the surface layers were evaluated as "A". Also, conveying belts with cracking observed at one location were evaluated as "B", and conveying belts with cracking observed at two or more locations were evaluated as "C". In a case where the evaluation results were A or B, it was possible to determine that bending resistance was sufficient. On the other hand, in a case where the evaluation results were C, bending resistance was determined not to be sufficient.

(6) Durable Slipperiness

The conveying belts were set in the above paper conveying units, and a duration test of causing them to rotate at a peripheral speed of 420 mm/second for 240 hours was conducted. Friction coefficients before and after the duration test were measured by a friction coefficient measurement instrument (manufactured by Shinto Scientific Co., Ltd., HEIDON Type 94i), and the amounts of changes in friction coefficients were recorded. The amounts of change (amounts of increase) in friction coefficients of less than 5% with reference to values before the duration were evaluated as "A+", the amounts of changes of equal to or greater than 5% and less than 10% were evaluated as "A", the amounts of changes of equal to or greater than 10% and less than 15% were evaluated as "B", and the amounts of change of equal to or greater than 15% were evaluated as "C". In a case where the evaluation results were A+, A, or B, it was possible to determine that duration slipperiness was sufficient. On the other hand, in a case where the evaluation results were C, duration slipperiness was determined not to be sufficient.

[Evaluation Results]

Tables 3 and 4 show configurations of the conveying belts and evaluation results in Examples 1 to 19 and Comparative Examples 1 to 11. In the upper section, the types of compositions used to form the surface layers (the above compositions A-1 to A-7, the compositions B to J, compositions K1 to K4, and compositions L to M), concentrations of siloxane and amounts of added silicone modifiers, measured values of microhardness, and types, elastic moduli, and thicknesses of resins used to form the base layers are shown. In the lower section, evaluation results of the conveying belts are shown.

TABLE 3

| | | Example | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Surface layer | Composition type | A-1 | B | C | D | E | A-2 | A-3 | A-1 | | F | A-4 | A-5 | A-1 | | K-1 | K-2 | | L | |
| | Concentration of siloxane (mol %) | 65 | 50 | 40 | 55 | 70 | | | | 65 | | | | | | 96 | | | 99 | |
| | Amount of added modifier (phr0 | | 3 | | | | 1 | 5 | | | 3 | | | | 1 | 5 | | 1 | | |
| | Microhardness (N/mm$^2$) | 115 | 120 | 125 | 318 | 112 | | | 115 | | | 30 | 200 | | | 115 | | | | |
| | Leveling agent | | | | | | | | | None | | | | | | | | Si | F | |
| | Presence of hydroxy group | | | | | | | | | | Present | | | | | | | | | |
| Base layer | Resin type | | | PI-1 | | | | | PI-2 | PI-3 | | | | | PI-1 | | | | | |
| | Elastic modulus (GPa) | | | 5 | | | | | 3 | 7 | | | | | 5 | | | | | |
| | Thickness (μm) | | | | | | | 70 | | | | | 50 | 90 | | | 70 | | | |
| Evaluation | Sliding sound | A+ | A | B | A | A | A | B | B | B | A | B | B | B | B | A | A | A | A | A |
| | Abrasion resistance | A | A | A | A | A | A | A | A | A | B | A | A | A | A | A | A | A | A | A |
| | Surface smoothness | A | A | A | A | A | A | A | A | A | A | A | A | A | A | A | A | B | A | A |
| | Bending resistance | A | A | A | A | A | A | A | B | A | A | B | A | B | A | A | A | A | A | A |
| | Durable slipperiness | A | A | B | A | A | B | B | B | B | A | B | A | A | A+ | A+ | A+ | A+ | A+ | |

TABLE 4

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Surface layer | Composition type | G | H | A-6 | A-7 | A-1 | A-1 | I | J | K-3 | K-4 | M |
| | Concentration of siloxane (mol %) | 35 | 75 | | | 65 | | | 65 | | 96 | 100 |

TABLE 4-continued

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Amount of added modifier (phr) | 3 | | 0.5 | 7 | | 3 | | 3 | 0.5 | 7 | 1 |
| | Microhardness (N/mm$^2$) | | | | | | 115 | | | | | |
| | Leveling agent | | | | | | None | | | | | |
| | Presence of hydroxy group | | | | Present | | None | | None | | Present | None |
| Base layer | Resin type | | | PI-1 | | PI-4 | PI-5 | | | PI-1 | | |
| | Elastic modulus (GPa) | | | 5 | | 2 | 9 | | | 5 | | |
| | Thickness (μm) | | | | | | 70 | | | | | |
| Evaluation | Sliding sound | C | C | C | C | C | C | C | C | C | C | C |
| | Abrasion resistance | B | B | B | B | A | A | B | B | B | B | B |
| | Surface smoothness | A | A | A | A | A | A | A | A | A | A | A |
| | Bending resistance | A | A | A | A | A | B | A | A | A | A | A |
| | Durable slipperiness | C | C | C | C | C | C | C | C | C | C | C |

According to Table 3, the base layers were configured of polyimide with elastic moduli of equal to or greater than 3 GPa and equal to or less than 7 GPa, and the surface layers were configured as cured objects of resin compositions in which the fluororesins having hydroxy groups and silicone modifiers were added in amounts of equal to or greater than 1 phr and equal to or less than 5 phr in all the conveying belts in Examples 1 to 14. The silicone modifiers had hydroxy groups, and content proportions of siloxane units were equal to or greater than 40 mol % and equal to or less than 70 mol %. In accordance with the conveying belts having such configurations, the results of evaluating sliding sound were equal to or greater than B, and the effect of curbing sliding sound at a time after endurance was sufficiently obtained in all Examples 1 to 14. Moreover, abrasion resistance, bending resistance, and durable slipperiness were also evaluated as being equal to or greater than B in these examples, and it was possible to interpret that each of these excellent properties exhibited the effect of curbing sliding sound. In these examples, surface smoothness of the surface layers was also high.

On the other hand, according to Table 4, configurations of the conveying belt did not satisfy some of the requirements listed above in Comparative Examples 1 to 8 and 11. The results of evaluating sliding sound were C, and curbing of sliding sound at a time after endurance was not sufficiently achieved in all Comparative Examples 1 to 8 and 11. In regard to the other evaluation results, at least durable slipperiness was evaluated as C, which is low. Hereinafter, each comparative example will be discussed.

In Comparative Example 11, a copolymer including a silicon unit and another kind of unit was not used as a silicone modifier to be added to the surface layer, and silicone oil itself was used instead. Therefore, sufficient durable slipperiness was not obtained in the surface layer. As a result, the effect of curbing sliding at a time after endurance was not sufficiently achieved.

Although the resin compositions containing the silicone copolymers were used as the silicone modifiers in Comparative Examples 1 to 4, the concentrations of siloxane in the silicone copolymers or the amounts of added silicone copolymers did not fall within the above predetermined range. In Comparative Example 1, the concentration of siloxane in the silicone modifier was below 40 mol %. Accordingly, sufficient durable slipperiness was not obtained in the surface layer. On the other hand, the concentration of siloxane was above 70 mol % in Comparative Example 2. Accordingly, sufficient durable slipperiness was not obtained in the surface layer. On the basis of these results, it was possible to state that causing the concentration of siloxane to fall within the range of equal to or greater than 40 mol % and equal to or less than 70 mol % was important to secure high durable slipperiness in the surface layer and to cause it to sufficiently contribute to curbing of sliding sound at a time after endurance.

In Comparative Example 3, the amount of added silicone modifier in the surface layer forming composition was below 1 phr. Accordingly, sufficient durable slipperiness was not obtained in the surface layer. On the other hand, the amount of added silicone modifier was above 5 phr in Comparative Example 4. Accordingly, sufficient durable slipperiness was not obtained in the surface layer. On the basis of these results, it was possible to state that causing the amount of silicone modifier added to the surface layer forming composition to fall within the range of equal to or greater than 1 phr and equal to or less than 5 phr was important to secure durable slipperiness in the surface layer and to cause it to sufficiently contribute to curbing of sliding sound at the time of endurance.

In Comparative Example 5, the elastic modulus of the base layer was below 3 GPa. Accordingly, durable slipperiness was low. On the other hand, the elastic modulus of the base layer was above 7 GPa in Comparative Example 6. Accordingly, bending resistance and durable slipperiness were low. On the basis of these results, it was possible to state that configuring the base layer using polyimide with an elastic modulus of equal to or greater than 3 GPa and equal to or less than 7 GPa was important in order to secure high durable slipperiness and bending resistance and sufficiently curb sliding sound at a time after endurance over the entire conveying belt. In a case where polyamide-imide was used as the constituent material of the base layer, similar effects were obtained.

In Comparative Examples 7 and 8, the silicone modifiers did not have hydroxy groups, and the silicone modifiers were thus not fixed to the fluororesins. Accordingly, abrasion resistance of the surface layers was slightly degraded, and satisfactory durable slipperiness was not obtained. On the basis of these results, it was necessary for the silicone modifiers to have hydroxy groups in order to secure high durable slipperiness and abrasion resistance and sufficiently curb sliding sound at a time after endurance.

Also, Examples 1 to 14 were compared with each other. In mutual comparison among Examples 1 to 4 which were different only in the concentrations of siloxane in the silicone modifiers, a particularly excellent effect of curbing sliding sound and durable slipperiness were obtained in Examples 1, 2, and 4 in which the concentrations of siloxane were equal to or greater than 45 mol % as compared with Example 3 in which the concentration of siloxane was less than 45 mol %. In particular, a significantly high effect of curbing sliding sound and durable slipperiness were obtained in Example 1 in which the concentration of siloxane was equal to or greater than 60 mol %. On the basis of these results, it was possible to state that durable slipperiness of the surface layers was effectively improved, and as a result, the effect of curbing sliding sound became high by setting the concentration of siloxane in the silicone modifier to be equal to or greater than 45 mol % and further equal to or greater than 60 mol %. However, the effect of curbing sliding sound was slightly low in Example 5 in which the concentration of siloxane was as further high as 70 mol % as compared with Example 1. On the basis of these results, it is possible to state that although the concentration of siloxane in the silicone modifier may be, in some embodiments, equal to or greater than 45 mol % and further equal to or greater than 60 mol %, it may be to cause the concentration of siloxane to fall within a range of less than 70 mol % with an enough margin.

In mutual comparison among Examples 1, 6, and 7 which were different only in the amounts of added silicone modifiers, particularly high durable slipperiness and effect of curbing sliding sound were obtained in Example 1 in which the amount of addition was equal to or greater than 2 phr and equal to or les than 3 phr. Also, in mutual comparison among Examples 1, 11, and 12 which were different only in microhardness of the surface layers, the effect of curbing sliding sound and the bending resistance were slightly lower when the microhardness was higher while the effect of curbing sliding sound, abrasion resistance, and durable slipperiness were slightly low when the microhardness was lower. It was possible to state that a particularly high effect of curbing sliding sound was obtained due to excellent abrasion resistance, durable slipperiness, and bending resistance with a satisfactory balance in Example 1 of the intermediate microhardness.

The silicone modifies were configured of acrylate-modified silicone oil, and silicone copolymers including methyl methacrylate and 2-hydroxyethyl methacrylate in each of examples other than Example 10, while butyl methacrylate was used instead of methyl methacrylate in Example 10 (Silicone F in Table 1). Example 10 was different from Example 1 only in the molecule structures of the silicone modifiers, and a more excellent effect of curbing sliding sound was achieved in Example 1. On the basis of this, it was possible to state that sliding sound was able to be effectively curbed by using acrylate-modified silicone oil and the silicone copolymer including methyl methacrylate and 2-hydroxyethyl methacrylate as the silicone modifier. It was precluded that a higher effect of improving slipperiness caused by the silicone unit appeared when a unit having a smaller number of carbons was used as the other kind of unit configuring the silicone copolymer along with the silicone unit.

In Examples 1, 8, and 9, elastic moduli of the basis layers were different from each other. In Example 1 in which the elastic modulus was equal to or greater than 4 GPa and equal to or less than 6 GPa, durable slipperiness was high as compared with both Examples 8 and 9. On the basis of this, it was possible to state that if the elastic modulus of the base layer was equal to or greater than 4 GPa and equal to or less than 6 GPa, both durable slipperiness and bending resistance were excellent and as a result a high effect of curbing sliding sound was obtained. Also, in Examples 1, 13, and 14, the thicknesses of the base layers were different from each other. In Example 1, more excellent bending resistance was achieved, and as a result, a higher effect of curbing sliding sound was obtained as compared with Example 14 in which the base layer was relatively thick. The effect of curbing sliding sound was higher in comparison with Example 13 in which the base layer was relatively thin as well. Note that since wrinkles slightly occurred in the conveying belt when the conveying belt was attached to a paper conveying unit due to the relatively thin base layer in Example 13, the effect of curbing sliding sound was not as high as that in the case of Example 1.

Also, according to Table 3, the base layers were configured of polyimide having elastic moduli of equal to or greater than 3 GPa and equal to or less than 7 GPa, and the surface layers were configured as cured objects of resin compositions in which the fluororesins having hydroxy groups and silicone modifies were added in amounts of equal to or greater than 1 phr and equal to or less than 5 phr in all the conveying belts in Examples 15 to 19. The silicone modifies had hydroxy groups, and the content proportions of siloxane units were equal to or greater than 95 mol % and less than 100 mol %. In accordance with the conveying belts having such configurations, the evaluation results of sliding sound were equal to or greater than A in the evaluation, and the effects of curbing sliding sound at a time after endurance were significantly high, in all Examples 15 to 19. Moreover, abrasion resistance, bending resistance, and durable slipperiness of the surface layers were also evaluated as being equal to or greater than A in these examples, and it was possible to interpret that each of these excellent properties exhibited the effects of curbing sliding sound.

On the other hand, according to Table 4, configurations of the conveying belts did not satisfy any of the requirements listed above in Comparative Examples 2 and 9 to 11. The evaluation results of sliding sound in all Comparative Examples 2 and 9 to 11 were C, and curbing of sliding sound at a time after endurance was not able to be sufficiently achieved. In regard to other evaluation results, at least durable slipperiness was evaluated as C, which was low evaluation. Hereinafter, each comparative example will be discussed.

In Comparative Examples 2 and 9 to 11, the resin compositions containing the silicone polymers were used as the silicone modifiers, but the concentrations of siloxane in the silicone copolymers or the amounts of added silicone copolymers were not within the above predetermined range. In Comparative Example 2, the concentration of siloxane in the silicone modifier was below 95 mol %. Accordingly, sufficient durable slipperiness was not obtained in the surface layer. On the other hand, the concentration of siloxane was 100 mol in Comparative Example 11. Accordingly, sufficient durable slipperiness was not obtained in the surface layer. On the basis of these results, it was possible to state that causing the concentration of siloxane to fall within a range of equal to or greater than 95 mol % and less than 100% was important in order to secure high durable slipperiness in the surface layer and cause it to sufficiently contribute to curbing of sliding sound at a time after endurance.

In Comparison Example 9, the amount of added silicone modifier to the surface layer forming composition was below 1 phr. Accordingly, sufficient durable slipperiness was not obtained in the front layer. On the other hand, the amount of added silicone modifier was over 5 phr in Comparative Example 10. Accordingly, sufficient durable slipperiness was not obtained in the front layer. On the basis of these results, it was possible to state that it was important to cause the amount of added silicone modifier to the surface layer forming composition to fall within a range of equal to or greater than 1 phr and equal to or less than 5 phr in order to secure durable slipperiness in the surface layer and cause it to sufficiently contribute to curbing of sliding sound at a time after endurance.

Also, although there was a trend that surface smoothness was degraded (Examples 15 and 17) when the concentrations of siloxane in the silicone copolymers were further higher concentrations in comparison among Examples 15 to 19, it was possible to ascertain that degradation of surface smoothness was curbed by adding the fluorine-based or silicone-based leveling agents.

Although the embodiment of the present disclosure has been described in detail, the present disclosure is not limited to the above embodiment, and various modifications can be made without departing from the gist of the present disclosure.

The invention claimed is:

1. A conveying belt for an image forming device comprising: a cylindrical base layer; and a surface layer that is formed on the outer peripheral surface of the base layer,
   wherein the base layer contains at least one kind of polyimide or polyamide-imide,
   the base layer has an elastic modulus of equal to or greater than 3 GPa and equal to or less than 7 GPa,
   the surface layer is configured as a cured object from a resin composition that contains a fluororesin having a hydroxy group, an isocyanate curing agent, and a silicone copolymer,
   the silicone copolymer is a copolymer containing a silicone unit having a siloxane skeleton and another kind of unit not having a siloxane skeleton and has a hydroxy group,
   the silicone copolymer contains siloxane units in a proportion of equal to or greater than 95 mol % and less than 100 mol %, and
   the silicone copolymer content in the resin composition is equal to or greater than 1 part by mass and equal to or less than 5 parts by mass relative to a total of 100 parts by mass of the fluororesin and the isocyanate curing agent.

2. The conveying belt according to claim 1, wherein the surface layer contains a fluorine-based or silicone-based leveling agent.

3. The conveying belt according to claim 1, wherein the surface layer has a surface, and a microhardness on the surface of the surface layer is equal to or greater than 30 N/mm$^2$ and equal to or less than 200 N/mm$^2$.

4. The conveying belt according to claim 1, wherein the base layer has a thickness, and the thickness of the base layer is equal to or greater than 50 µm and equal to or less than 90 µm.

5. The conveying belt according to claim 1, wherein the silicone copolymer is configured of either acrylate-modified silicone oil and an OH-modified silicone oil as the silicone unit or methyl methacrylate and either 2-hydroxyethyl methacrylate and trimethylolpropane as the other kind of unit.

6. A conveying belt for an image forming device comprising: a cylindrical base layer; and a surface layer that is formed on the outer peripheral surface of the base layer,
   wherein the base layer contains at least one kind of polyimide or polyamide-imide,
   the base layer has an elastic modulus of equal to or greater than 3 GPa and equal to or less than 7 GPa,
   the surface layer is configured as a cured object from a resin composition that contains a fluororesin having a hydroxy group, an isocyanate curing agent, and a silicone copolymer,
   the silicone copolymer is a copolymer containing a silicone unit having a siloxane skeleton and another kind of unit not having a siloxane skeleton and has a hydroxy group,
   the silicone copolymer contains siloxane units in a proportion of equal to or greater than 40 mol % and less than 70 mol %, and
   the silicone copolymer content in the resin composition is equal to or greater than 1 part by mass and equal to or less than 5 parts by mass relative to a total of 100 parts by mass of the fluororesin and the isocyanate curing agent.

7. The conveying belt according to claim 6, wherein the surface layer contains a fluorine-based or silicone-based leveling agent.

8. The conveying belt according to claim 6, wherein the surface layer has a surface, and a microhardness on the surface of the surface layer is equal to or greater than 30 N/mm$^2$ and equal to or less than 200 N/mm$^2$.

9. The conveying belt according to claim 6, wherein the base layer has a thickness, and the thickness of the base layer is equal to or greater than 50 µm and equal to or less than 90 µm.

10. The conveying belt according to claim 6, wherein the silicone copolymer is configured of either acrylate-modified silicone oil and an OH-modified silicone oil as the silicone unit or methyl methacrylate and either 2-hydroxyethyl methacrylate and trimethylolpropane as the other kind of unit.

* * * * *